US008345393B1

(12) United States Patent
Martinez et al.

(10) Patent No.: US 8,345,393 B1
(45) Date of Patent: Jan. 1, 2013

(54) EXTERIOR PRIMARY FUSE SYSTEM FOR TRANSFORMERS

(76) Inventors: Mike Martinez, Lakeside, AZ (US); Brian Brownlow, Lakeside, AZ (US); Randy McFall, Lakeside, AZ (US)

(*) Notice: Subject to any disclaimer, the term of this patent is extended or adjusted under 35 U.S.C. 154(b) by 876 days.

(21) Appl. No.: 12/387,565

(22) Filed: May 4, 2009

Related U.S. Application Data

(60) Provisional application No. 61/126,214, filed on May 2, 2008.

(51) Int. Cl.
*H02H 7/00* (2006.01)

(52) U.S. Cl. .......................................................... 361/41

(58) Field of Classification Search ..................... 361/41
See application file for complete search history.

(56) References Cited

U.S. PATENT DOCUMENTS

| | | | | |
|---|---|---|---|---|
| 3,916,260 | A * | 10/1975 | Westrom et al. | 361/41 |
| 3,953,818 | A * | 4/1976 | Martin et al. | 337/191 |
| 4,743,996 | A | 5/1988 | Book | |
| 4,885,561 | A | 12/1989 | Veverka et al. | |
| 5,898,556 | A | 4/1999 | de Sedouy et al. | |
| 5,982,267 | A | 11/1999 | Locht | |
| 6,181,125 | B1 | 1/2001 | Li et al. | |
| 6,479,780 | B2 | 11/2002 | Virtanen et al. | |
| 6,624,736 | B1 | 9/2003 | Cotton et al. | |
| 6,839,207 | B2 | 1/2005 | Folliot et al. | |

* cited by examiner

*Primary Examiner* — Stephen W Jackson
(74) *Attorney, Agent, or Firm* — Montgomery Patent & Design LLC; Robert C. Montgomery

(57) ABSTRACT

An externally replaceable primary fuse for a pole-mount electrical distribution transformer, thereby eliminating a need for a conventional internal fuse, and a method of use thereof is herein disclosed. The fuse is accessed using a bayonet-style fuse holder mounted to an outside surface of a transformer tank being internally wired thereto a primary transformer lead. The fuse holding apparatus permits fuse replacement while the transformer remains mounted to a pole, providing a reduction of down time and expense during said fuse replacement.

17 Claims, 4 Drawing Sheets

EXTERIOR PRIMARY FUSE SYSTEM FOR TRANSFORMERS

RELATED APPLICATIONS

The present invention was first described in and claims the benefit of U.S. Provisional Application No. 61/126,214, filed May 2, 2008, the entire disclosures of which are incorporated herein by reference.

FIELD OF THE INVENTION

The present invention relates generally to a primary fuse system for a transformer, and more particularly, to an exterior primary fuse system for a transformer.

BACKGROUND OF THE INVENTION

Just about all of the electricity used in our daily lives passes through multiple transformers between the generating facility and the final destination where it is utilized by various electrical powered devices. In many cases the last transformer used is the pole mounted transformer commonly seen between every few houses upon power poles in a neighborhood. High voltage fuses used to protect these small power transformers are common and preferred where the expense of a circuit breaker is not warranted. These protective devices incorporate high range current-limiting fuses, low range current-limiting fuses, or combination high range and low range current-limiting fuses. Although transformers and fuse assemblies are highly reliable and dependable they are known to be easily taken out by nearby faults or lightning strikes. When this happens the most common result is a blown primary fuse. Conventionally, the fuse is located on the interior of the transformer under oil and is normally permanently connected to the transformer lead by a terminal clamp or similar mechanism, thus forcing a complete emergency transformer replacement in the field and a rebuild in a shop. This means extended outage times for what is a simple blown fuse. Additionally, fuse holders generally comprise many parts which can be unwieldy and costly to assemble, disassemble, and transport and store.

Various examples of attempts to provide over current protection to electrical devices including power transformers and means of mounting and holding such devices include: U.S. Pat. No. 4,743,996, issued in the name of Book, which describes an electrical distribution apparatus having fused draw-out surge arrester; U.S. Pat. No. 4,885,561, issued in the name of Veverka et al., which describes a transformer overload and fault protection apparatus; U.S. Pat. No. 5,898,556, issued in the name of de Sedouy et al., which describes a protection system for a three-phase distribution transformer insulated in a liquid dielectric; U.S. Pat. No. 5,982,267, issued in the name of Locht, which describes a fuse holder for distribution transformers; U.S. Pat. No. 6,181,125, issued in the name of Li et al., which describes a combination apparatus of a distribution transformer and switches; U.S. Pat. No. 6,479,780, issued in the name of Virtanen et al., which describes a circuit breaker for disconnecting an electrical apparatus from an electrical network; U.S. Pat. No. 6,624,736, issued in the name of Cotton et al., which describes a fuse housing with rate release control plug; and U.S. Pat. No. 6,839,207, issued in the name of Folliot et al., which describes a protection system for protecting a poly-phase distribution transformer insulated in a liquid dielectric, the system including at least one phase disconnector switch.

While these devices fulfill their respective, particular objectives, each of these references suffers from one (1) or more of the aforementioned disadvantages. Accordingly, there exists a need for a means by which primary fusing on pole-mounted transformers can be easily replaced without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to access, remove, and replace fuse devices used with pole mounted electrical transformers while the transformer remains mounted to the pole, eliminating the requirement of removing the entire transformer for maintenance of a blown fuse and thus, the object of the present invention is to solve the aforementioned disadvantages.

To achieve the above objectives, it is an object of the present invention to provide an exterior primary fuse system for transformers that is particularly applied to modified pole-mount electrical distribution transformers that eliminated the requirement to remove and disassemble the transformer in order to replace an internally accessed fuse. The exterior primary fuse system for transformers enables the fuse to be accessed using an extractable bayonet-style fuse holder externally mounted along a side surface of a modified transformer container. The fuse is immersed in oil similar to a conventional internal fuse during use and permits replacement of the fuse while the transformer unit remains mounted to a power pole which reduces down time and lost service expenses.

Another object of the exterior primary fuse system for transformers is to provide an apparatus comprising a transformer container, a container lid, at least one (1) connector, at least one (1) internal winding, a fuse holder receiver, a fuse holder assembly, at least one (1) external voltage connector, and two (2) primary wires. The fuse holder assembly comprises a fuse holder, a threaded cylindrical electrical isolation fuse attachment, a fuse, a handle, a flange, and a seal that form a removably attached assembly.

Yet still another object of the exterior primary fuse system for transformers is to provide a transformer container that provides a modified version of a conventional transformer container comprising an inserted attachment means to a fuse holder assembly via a pre-drilled elliptical-shaped aperture along an upper side surface.

Yet still another object of the exterior primary fuse system for transformers is to provide a fuse holder assembly that is retained within a fuse holder receiver via a sealed friction-fit connection. Extraction of the fuse holder from the fuse holder receiver is accomplished by engaging a handle using a "hot-stick" enabling removal of the fuse holder assembly including spent fuse, as an assembly.

Yet another object of the exterior primary fuse system for transformers is to provide a fuse holder assembly that operates in conjunction with the fuse holder receiver that comprises at least two (2) terminals and provides a fusible current interrupting means to the received primary power via the removable fuse. After current passes through the fuse it is conducted via a terminal to a primary wire and routed to an internal winding to obtain a desired step-down voltage and subsequently wired to a connector for local distribution of electrical service.

Yet still another object of the exterior primary fuse system for transformers is to provide a container mount assembly that provides an effective oil-tight seal to the aperture via a compressed gasket.

Yet still another object of the exterior primary fuse system for transformers is to provide a lid-mounted embodiment of the apparatus that provides an alternate mounting and orientation of the fuse holder receiver and corresponding fuse holder assembly. The fuse holder receiver is installed along a lid portion of a transformer container and may result in reduced oil spillage during a fuse replacement and improved accessibility to the fuse holder assembly due to the particular positions and locations of the transformer in the field.

Yet still another object of the exterior primary fuse system for transformers is to provide a method of utilizing the apparatus which allows for quick and easy power transformer primary fuse replacement in a manner which is quick, easy, and effective.

Further objects and advantages of the exterior primary fuse system for transformers will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| DESCRIPTIVE KEY | |
|---|---|
| 10 | exterior primary fuse system for transformers |
| 21 | fuse holder receiver |
| 25 | first terminal |
| 26 | second terminal |
| 27 | first flange |
| 30 | primary connector |
| 31 | first primary wire |
| 32 | second primary wire |
| 34 | container mount assembly |
| 35 | second flange |
| 36 | gasket |
| 37 | locknut |
| 40 | first transformer container |
| 41 | first lid |
| 42 | secondary connector |
| 43 | oil |
| 45 | winding |
| 47 | aperture |
| 50 | lid-mounted embodiment |
| 51 | second transformer container |
| 52 | second lid |
| 60 | fuse holder assembly |
| 62 | fuse holder |
| 64 | handle |
| 66 | third flange |
| 68 | seal |
| 70 | fuse attachment |
| 80 | fuse |

DETAILED DESCRIPTION OF THE PREFERRED EMBODIMENT

Figure 1:
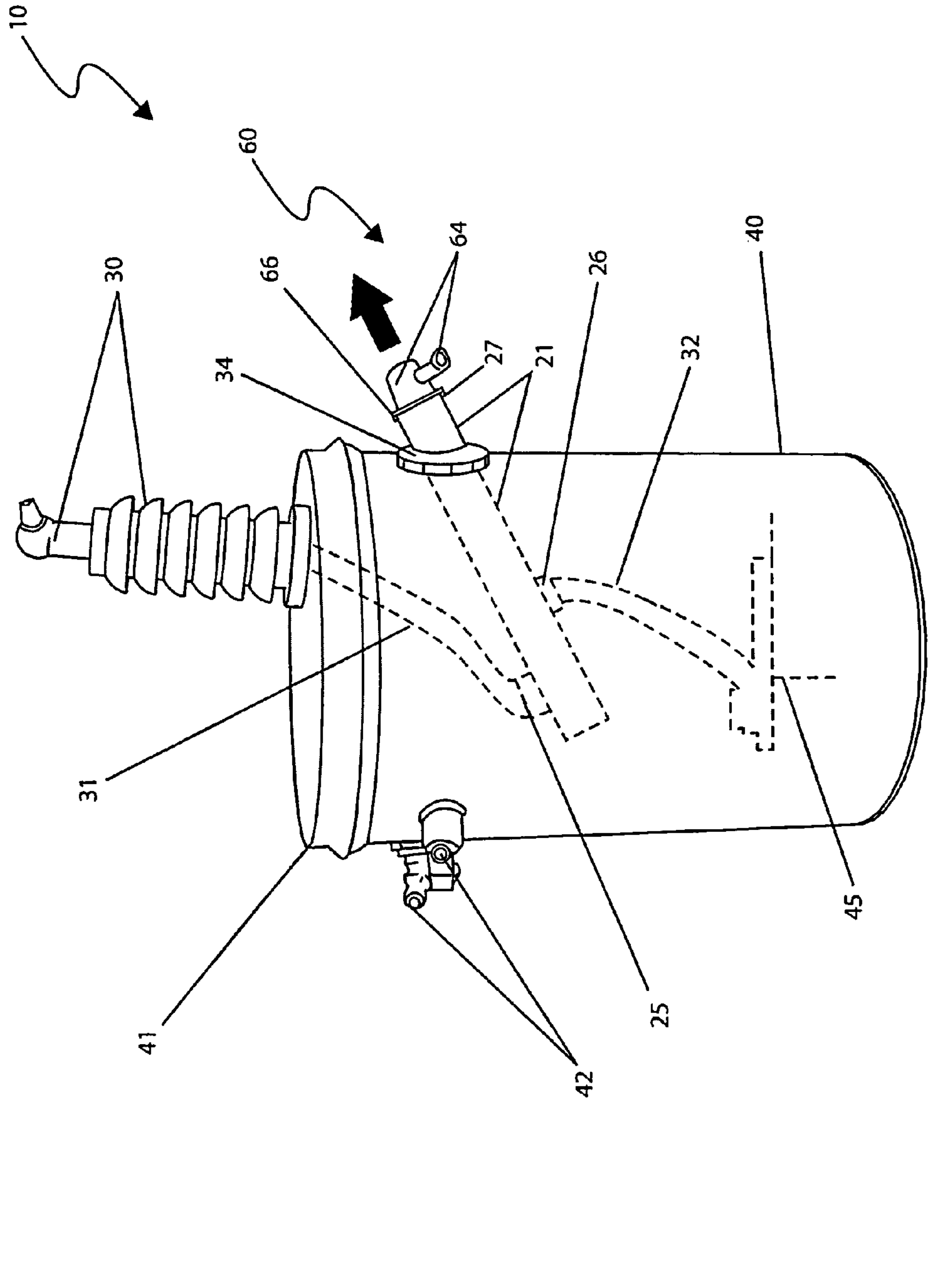
FIG. 1 is a side perspective view of an exterior primary fuse system for transformers 10 depicting an in-use state, according to a preferred embodiment of the present invention.
Figure 2A:
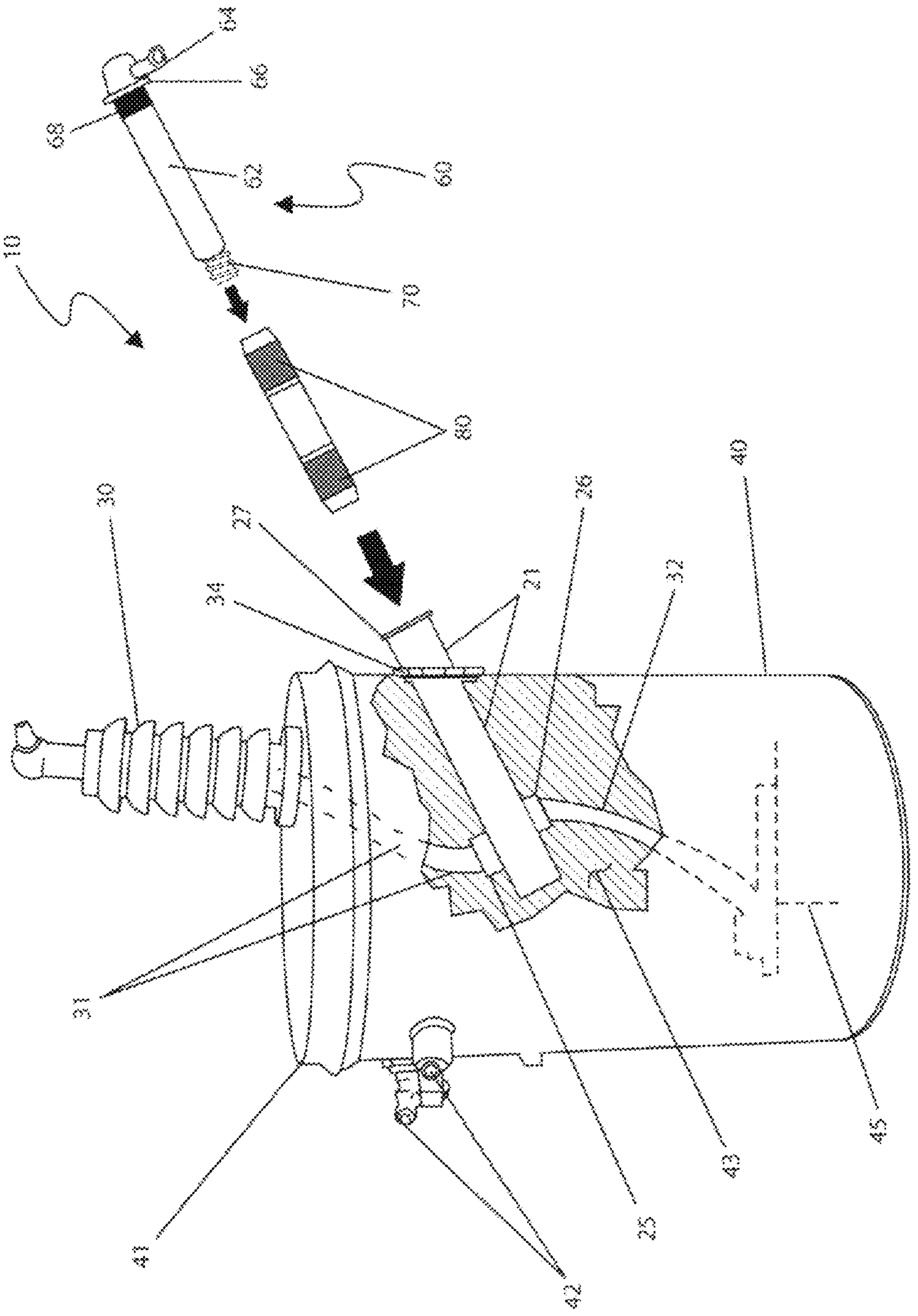
FIG. 2*a* is a partial cut-away view of the exterior primary fuse system for transformers 10 depicting a fuse replacement activity, according to a preferred embodiment of the present invention.
Figure 2B:
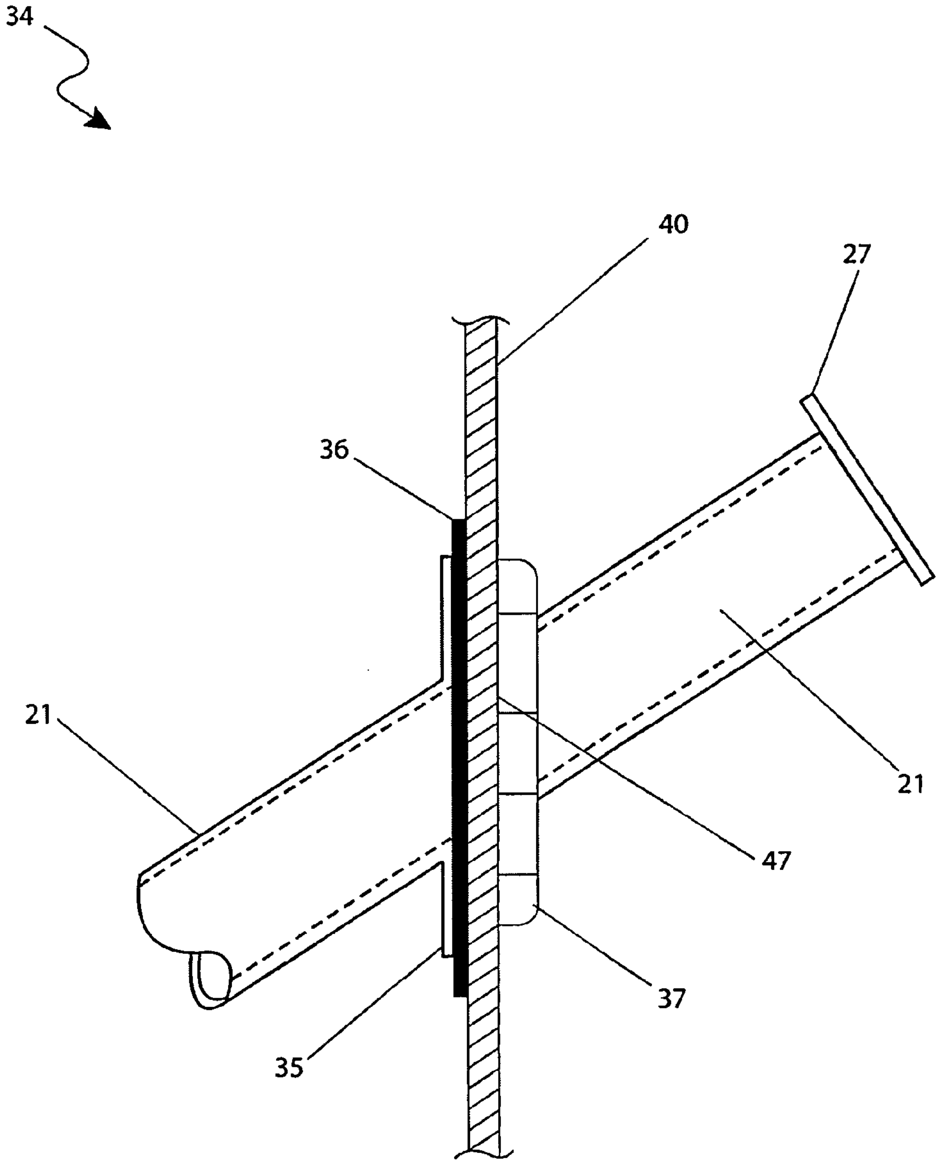
FIG. 2*b* is a side view of a container mount assembly portion 34 of the exterior primary fuse system for transformers 10, according to a preferred embodiment of the present invention; and, FIG. 3 is a side perspective view of a lid-mounted embodiment 50 of the exterior primary fuse system for transformers 10, according to an alternate embodiment of the present invention.
Figure 3:
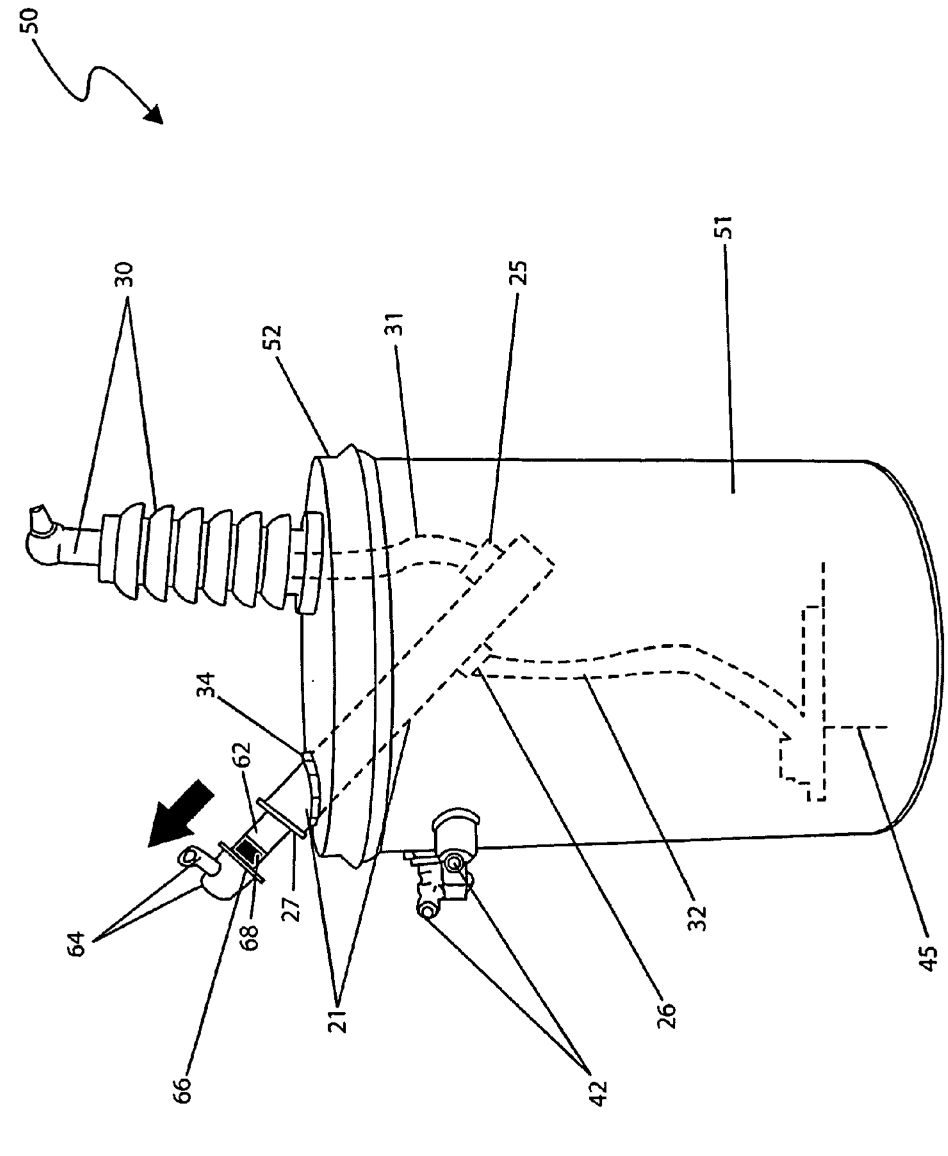

The best mode for carrying out the invention is presented in terms of its preferred embodiment, herein depicted within FIGS. 1 through 2*b* and in terms of an alternate embodiment as depicted in FIG. 3. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an exterior primary fuse system for a transformer (herein described as the "apparatus") 10, particularly applied thereto pole-mount electrical distribution transformers, thereby eliminating a need to remove and disassemble said transformer to replace an internally accessed fuse 80. The apparatus 10 allows the fuse 80 to be accessed using an extractable bayonet-style fuse holder 62 mounted externally therealong a side surface of a modified transformer container 40. The fuse 80 would remain immersed in oil 43 similar thereto a conventional internal fuse during use. The apparatus 10 permits replacement of the fuse 80 while the transformer unit 40 remains mounted to a power pole which reduces down time and lost service expenses.

Referring now to FIGS. 1 and 2*a*, side perspective and partial cut-away views of the apparatus 10 depicting in-use and fuse replacing states, according to the preferred embodiment of the present invention, are disclosed. The apparatus 10 takes the form of a conventional pole-mounted transformer comprising an externally mounted and accessed bayonet-type fuse holder assembly 60 being mounted thereto an outer cylindrical wall, thereby providing quick external access and removal of an attached cartridge-type fuse 80. The apparatus 10 further comprises a cylindrical first transformer container 41, a first lid 41, an internal volume of oil 43, internal primary and secondary windings 45, and one (1) or more external secondary voltage connectors 42. The apparatus 10 is illustrated here as a unit comprising a single primary connector 30; however, it is understood by those skilled in the art that the apparatus 10 may be applied thereto other types of transformers such as those having two (2) primary connectors without deviating from the concept and as such should not be considered a limiting factor of the invention. The first transformer container 40 provides a modified version of a conventional transformer container comprising an inserted attachment means thereto a fuse holder assembly 60 therethrough a pre-drilled elliptical-shaped aperture 47 along an upper side surface (see FIG. 2*b*).

The fuse holder assembly 60 is illustrated in FIG. 2*b* depicting an exploded view thereof. The fuse holder assembly 60 comprises a generally cylindrical construction approximately twelve (12) to eighteen (18) inches long and partially projecting therefrom a wall portion of the first transformer container 40 at an angle of approximately thirty degrees (30°) to forty-five degrees (45°) from a horizontal plane. The fuse holder assembly 60 is retained therewithin a fuse holder receiver 21 via a sealed friction-fit connection. Extraction of the fuse holder 62 portion of the fuse holder assembly 60 therefrom the fuse holder receiver 21 is accomplished by engaging an aperture portion of the handle 64 using a "hot-stick", thereby allowing removal of the fuse holder 62, the handle 64, and the spent fuse 80, as an assembly.

The fuse holder assembly 60 comprises a bayonet-type fuse holder 62, a handle 64, a third flange 66, a seal 68, a fuse attachment 70, and a fuse 80 forming a removably attachable assembly. The bayonet fuse holder 62 is envisioned to be similar to commercially available high current units utilized to hold standard under-oil expulsion fuses being common in the power distribution industry. The fuse holder 62 comprises a cylindrical electrical isolation device further comprising a fuse attachment 70 which provides a threaded attachment means thereto the fuse 80. The fuse attachment 70 comprises an integral protruding threaded region along a lower end portion of the fuse holder 62 being sized so as to threadingly engage and secure a corresponding female threaded portion of the fuse 80. The fuse holder 62 also provides an integral handle portion 64 located thereat an upper end portion which allows engagement and extraction thereof the fuse holder assembly 60 while maintaining a safe distance as previously described. The third flange 66 and the seal 68 provide an oil-tight seal when said fuse holder assembly 60 is inserted thereinto the fuse holder receiver 21. The seal 68 comprises a cylindrical annular rubber element forming an interference fit therewith an inner diameter of the fuse holder receiver 21, thereby sealing out water, contamination, and weather elements. To properly seat the fuse holder assembly 60, said fuse holder assembly 60 is inserted therein the fuse holder receiver 21 until reaching a mechanical limitation due to contact therebetween the first flange portion 27 of said fuse holder receiver 21 and the third flange portion 66 of the fuse holder assembly 60.

A typical configuration of the first transformer container 40 is illustrated here having a first lid portion 41 comprising a primary connector 30 providing conduction of primary electrical power thereto an internal first primary wire 31 which is in-turn routed thereto an interior space of the first transformer container 40 and subsequently thereto a first terminal portion 25 of the fuse holder receiver 21. The fuse holder assembly 60 works in conjunction therewith, and is insertingly attached thereto the fuse holder receiver 21 which further comprises the first terminal 25, a second terminal 26, and a container mount assembly 34. The fuse holder receiver 21 provides a fusible current interrupting means thereto said received primary power via the removable fuse 80. The fuse holder receiver 21 provides a sealed friction-fit to slidingly receive the previously described fuse holder assembly 60, thereby providing a high-current connection thereto opposing end portions of the fuse 80. The first 25 and second 26 terminals protrude perpendicularly therefrom side surfaces of said fuse holder receiver 21. After current passes therethrough the fuse 80, it is then conducted via the second terminal 26 thereto a second primary wire 32; routed thereto internal primary and secondary windings 45 to obtain a desired step-down voltage; and, subsequently wired thereto the secondary connectors 42 for local distribution of electrical service. The fuse holder receiver 21 extends thereinto a generally central portion of the first transformer container 40. The first primary wire 31 and second primary wire 32 provide a standard bolted and/or soldered electrical connection thereto the first terminal 25 and second terminal 26 portions, respectively. Said current is then conducted therethrough primary and secondary coils 45 and subsequently thereto one (1) or more secondary connectors 42 to provide local electrical service in a conventional manner.

Referring now to FIG. 2*b*, a side view of a container mount assembly portion 34 of the apparatus 10, according to a preferred embodiment of the present invention, is disclosed. A typical bayonet-type fuse holder receiver 21 providing a sealed container penetration is illustrated here comprising a second flange 35, a gasket 36, and a locknut 37. During fabrication, a first open end portion of the fuse holder receiver 21 comprising a first flange 27 is inserted therefrom an inner portion of the first transformer container 40 therethrough a pre-drilled elliptical-shaped aperture 47. The container mount assembly 34 provides an effective oil-tight seal thereto the aperture 47 via a compressed gasket 36. The threaded attachment of the locknut 37 along an exterior portion of said container mount assembly portion 34 causes compression of the gasket 36 therebetween the wall of the first transformer container 40 and the second flange 35, thereby resulting in a secure and sealed connection. The locknut 37 is tightened using a common wrenching tool to rotate said locknut 37 along an intermediate threaded region of the fuse holder receiver 21.

Referring now to FIG. 3, a side perspective view of a lid-mounted embodiment 50 of the apparatus 10, according to an alternate embodiment of the present invention, is disclosed. The lid-mounted embodiment 50 is illustrated here providing an alternate mounting and orientation of the fuse holder receiver 21 and corresponding fuse holder assembly 60. Said fuse holder receiver 21 is installed therealong the second lid portion 52 of a second transformer container 51. The alternate lid-mounted embodiment 50 is envisioned to comprise a similar fuse holder assembly 60 and method of installation as the preferred embodiment 10; however, said alternate lid-mounted embodiment 50 may result in reduced oil spillage during a fuse 80 replacement task as well as improved accessibility thereto said fuse holder assembly 60 based upon particular second transformer container 51 positions and locations in the field.

It is envisioned that other styles and configurations of the present invention can be easily incorporated into the teachings of the present invention, and only one particular configuration shall be shown and described for purposes of clarity and disclosure and not by way of limitation of scope.

The preferred and alternate embodiments of the present invention can be installed and utilized by a trained electrical technician in a simple and effortless manner with minimum training. After initial purchase or acquisition of the apparatus 10, it would be installed as indicated in FIGS. 1 and 3.

The method of installing and utilizing the preferred embodiment of the apparatus 10 may be achieved by performing the following steps: threadingly attaching a fuse 80 thereinto the fuse attachment portion 70 of the fuse holder assembly 60; inserting the fuse holder assembly 60 thereinto the fuse holder receiver 21 until the third flange 66 makes mechanical contact therewith the first flange 27; mounting the apparatus 10 thereto a standard power distribution pole in a conventional manner; installing all normal primary and secondary electrical connections thereto the primary connector 30 and secondary connector 42 portions of the first transformer container 40; remotely initiating a primary current thereto the apparatus 10; providing normal electrical service thereto local residences, businesses, or the like in an expected manner; replacing the fuse 80 in an event it is blown by grasping the handle portion 64 using a "hot-stick" device while standing at grade level; extracting the fuse holder assembly 60 therefrom the fuse holder receiver 21; threadingly detaching and discarding the blown fuse 80; threadingly installing a new fuse 80 thereto the fuse holder 62; reinserting the fuse holder assembly 60 thereinto the fuse holder receiver 21 using the handle 64 and "hot-stick" device; releasing the "hot-stick" therefrom the handle 64; and, benefiting from significant time and cost savings resulting from not being required to remove a transformer therefrom a power pole to replace a blown fuse 80 while utilizing the apparatus 10.

The method of installing and utilizing the alternate lid-mounted embodiment 50 may be achieved by performing the same steps as described above for the preferred embodiment 10; however, the fuse holder receiver 21 and fuse holder assembly 60 portions would be located thereat and extending therefrom the second lid portion 52 of the second transformer container 51.

Extraction of the fuse holder assembly 60 therefrom the fuse holder receiver 21 is envisioned to be accomplished by a qualified power line technician by mechanically engaging the handle portion 64 of the apparatus 10 using an electrically isolated "hot-stick" device while standing at a grade level. The "hot-stick" is inserted thereinto an integral aperture portion of the handle 64, thereby allowing extraction of the fuse holder 62, the handle 64, and the spent fuse 80 as an assembly therefrom a sealed friction-fit connection therewithin the fuse holder receiver 21 and fuse holder assembly 60 in a safe manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An exterior primary fuse system for a transformer, comprising:

- a transformer, further comprising:
  - a transformer container, comprising a cylindrical body having a container floor, a cylindrical container wall, and an oil-filled interior;
  - a container lid removably mounted to said container at an upper periphery of said cylindrical container wall;
  - a pre-drilled elliptical aperture;
  - a fuse holder receiver inserted in said pre-drilled aperture secured to said transformer container with a securing means, said fuse holder receiver removably receives a fuse holder assembly;
  - a primary connector located on said container lid providing conduction of primary electrical power from a power source to a first primary wire routed into said interior of said transformer container to said fuse holder receiver;
  - a second primary wire in electrical communication with said fuse holder receiver;
  - primary and secondary windings in electrical communication with said second primary wire; and,
  - secondary connectors in electrical communication with said primary and secondary windings, said secondary connectors outwardly project from said transformer container;
- and,
- a fuse removably attached thereto and supported thereby said fuse holder assembly therewithin said transformer;
- wherein said system is pole-mounted;
- wherein said primary and secondary windings provide a step-down means to a desired voltage;
- wherein said secondary connectors provide an electrical distribution for electrical service;
- wherein said system eliminates removal and disassembly of said transformer during replacement of said fuse;
- wherein said system provides a savings in cost for during replacement of said fuse; and,
- wherein said system reduces down-time during replacement of said fuse.

2. The system of claim 1, wherein said fuse holder receiver comprises a generally cylindrical sleeve extending generally thereinto a central location thereof said interior and further comprises:

- a first flange located thereat a first end;
- a first terminal portion in electrical communication therewith said internal first primary wire of said fuse holder receiver, protruding perpendicularly therefrom a side surface thereof a second end thereof said sleeve; and,
- a second terminal portion in electrical communication therewith said internal second primary wire of said fuse holder receiver, protruding perpendicularly therefrom a side surface thereof said second end thereof said sleeve opposite said first terminal portion;
- wherein said fuse holder receiver further comprises a fusible current interrupting means thereto said received primary power via said fuse; and,
- wherein said first flange provides a sealing means therewith said fuse holder assembly.

3. The system of claim 1, wherein said securing means comprises:

- a second flange with a gasket located at an intermediate periphery thereof said fuse holder receiver, such that said second flange and gasket are located within said interior of said transformer container;
- a threaded nipple located thereon said transformer container, projecting outwardly therefrom; and,
- a locknut threadably attached thereto said threaded nipple.

4. The system of claim 3, wherein said pre-drilled elliptical aperture is located therealong an upper side surface thereof said transformer container.

5. The system of claim 3, wherein said pre-drilled elliptical aperture is located therealong an upper surface thereof said container lid.

6. The system of claim 1, wherein said fuse holder assembly comprises a generally cylindrical electrical isolation body and further comprises:

- a fuse attachment means at a proximal end thereof;
- a handle portion located thereat a distal end thereof; and, a third flange and a seal located subjacent thereto said handle portion, thereby providing a sealing means when said fuse holder assembly is inserted thereinto said fuse holder receiver;

wherein said fuse holder assembly partially projects outwardly therefrom said transformer container at a projection angle;

wherein said handle provides an extraction means and a replacement means thereof said fuse holder assembly therein said fuse holder receiver; and, wherein said fuse is removably attached thereto said fuse holder assembly therewith said fuse attachment means.

7. The system of claim 6, wherein said fuse holder assembly comprises approximately twelve (12) to eighteen (18) inches in length.

8. The system of claim 6, wherein said projection angle comprises approximately thirty degrees (30°) to forty-five degrees (45°) from a horizontal plane.

9. The system of claim 6, wherein said seal further comprises a cylindrical annular rubber element forming an interference fit therewith an inner diameter of said fuse holder receiver.

10. A method of installing and utilizing an exterior primary fuse system for a transformer comprises the following steps:

providing said system, further comprising:

a transformer, further comprising:

a transformer container, comprising a cylindrical body having a container floor, a cylindrical container wall, and an oil-filled interior;

a container lid removably mounted thereto said container thereat an upper periphery thereof said cylindrical container wall;

a pre-drilled elliptical aperture located therealong an upper side surface thereof said transformer container;

a fuse holder receiver inserted therein said pre-drilled aperture secured thereto said transformer container therewith a securing means, further comprising a first flange located thereat a first end, a second flange and gasket intermediately located thereabout an outer surface thereof said fuse holder receiver, a first terminal portion in electrical communication therewith said internal first primary wire of said fuse holder receiver, protruding perpendicularly therefrom a side surface thereof a second end thereof said sleeve, and a second terminal portion in electrical communication therewith said internal second primary wire of said fuse holder receiver, protruding perpendicularly therefrom a side surface thereof said second end thereof said sleeve opposite said first terminal portion;

a primary connector located thereon said container lid providing conduction of primary electrical power therefrom a power source thereto a first primary wire routed thereinto said interior thereof said transformer container thereto said fuse holder receiver;

a second primary wire in electrical communication therewith said fuse holder receiver;

primary and secondary windings in electrical communication therewith said second primary wire; and, secondary connectors in electrical communication therewith said primary and secondary windings, said secondary connectors outwardly project therefrom said transformer container a fuse holder assembly removably attached thereto said fuse holder receiver, further comprising:

a fuse attachment means at a proximal end thereof;

a handle portion located thereat a distal end thereof; and, a third flange and a seal located subjacent thereto said handle portion, thereby providing a sealing means when said fuse holder assembly is inserted thereinto said fuse holder receiver; and, a fuse removably attached thereto and supported thereby said fuse holder assembly therewithin said transformer;

installing said fuse holder receiver thereto said transformer container by routing said first flange from within said interior therethrough said pre-drilled elliptical aperture and ensuring said second flange and gasket abuts an interior wall thereof;

securing said fuse holder receiver thereto said transformer container therewith a locknut;

threadingly attaching said fuse thereinto said fuse attachment means thereof said fuse holder assembly;

inserting said fuse holder assembly thereinto said fuse holder receiver until said third flange makes mechanical contact therewith said first flange, thereby producing said sealing means;

mounting said transformer thereto a power distribution pole;

installing all primary electrical connections thereto said primary connector;

installing all secondary electrical connections thereto said secondary connectors;

remotely initiating a primary current thereto said system;

providing electrical service therewith said system;

replacing said fuse when necessary by grasping said handle thereof said fuse holder assembly with an extraction tool;

extracting said fuse holder assembly therefrom said fuse holder receiver;

threadingly detaching and discarding said fuse;

threadingly installing a new fuse thereto said fuse holder assembly; and, reinserting said fuse holder assembly thereinto said fuse holder receiver therewith said extraction tool.

11. The method of claim 10, wherein said fuse holder assembly comprises approximately twelve (12) to eighteen (18) inches in length.

12. The method of claim 10, wherein said projection angle comprises approximately thirty degrees (30°) to forty-five degrees (45°) from a horizontal plane.

13. The method of claim 10, wherein said seal further comprises a cylindrical annular rubber element forming an interference fit therewith an inner diameter of said fuse holder receiver.

14. A method of installing and utilizing an exterior primary fuse system for a transformer comprises the following steps:

providing said system, further comprising:

a transformer, further comprising:

a transformer container, comprising a cylindrical body having a container floor, a cylindrical container wall, and an oil-filled interior;

a container lid removably mounted thereto said container thereat an upper periphery thereof said cylindrical container wall;

a pre-drilled elliptical aperture located thereat an upper surface thereof said container lid;

a fuse holder receiver inserted therein said pre-drilled aperture secured thereto said transformer container therewith a securing means, further comprising a first flange located thereat a first end, a second flange and gasket intermediately located thereabout an outer surface thereof said fuse holder receiver, a first terminal portion in electrical communication therewith said internal first primary wire of said fuse holder receiver, protruding perpendicularly therefrom a side surface thereof a second end thereof said sleeve, and a second terminal portion in electrical communication therewith said internal second primary wire of said fuse holder receiver, protruding perpendicularly therefrom a side surface thereof said second end thereof said sleeve opposite said first terminal portion;

a primary connector located thereon said container lid providing conduction of primary electrical power therefrom a power source thereto a first primary wire routed thereinto said interior thereof said transformer container thereto said fuse holder receiver;

a second primary wire in electrical communication therewith said fuse holder receiver;

primary and secondary windings in electrical communication therewith said second primary wire; and, secondary connectors in electrical communication therewith said primary and secondary windings, said secondary connectors outwardly project therefrom said transformer container a fuse holder assembly removably attached thereto said fuse holder receiver, further comprising:

a fuse attachment means at a proximal end thereof;

a handle portion located thereat a distal end thereof; and, a third flange and a seal located subjacent thereto said handle portion, thereby providing a sealing means when said fuse holder assembly is inserted thereinto said fuse holder receiver; and, a fuse removably attached thereto and supported thereby said fuse holder assembly therewithin said transformer;

installing said fuse holder receiver thereto said transformer container by routing said first flange from within said interior therethrough said pre-drilled elliptical aperture and ensuring said second flange and gasket abuts an interior wall thereof;

securing said fuse holder receiver thereto said transformer container therewith a locknut;

threadingly attaching said fuse thereinto said fuse attachment means thereof said fuse holder assembly;

inserting said fuse holder assembly thereinto said fuse holder receiver until said third flange makes mechanical contact therewith said first flange, thereby producing said sealing means;

mounting said transformer thereto a power distribution pole;

installing all primary electrical connections thereto said primary connector;

installing all secondary electrical connections thereto said secondary connectors;

remotely initiating a primary current thereto said system;

providing electrical service therewith said system;

replacing said fuse when necessary by grasping said handle thereof said fuse holder assembly with an extraction tool;

extracting said fuse holder assembly therefrom said fuse holder receiver;

threadingly detaching and discarding said fuse;

threadingly installing a new fuse thereto said fuse holder assembly; and, reinserting said fuse holder assembly thereinto said fuse holder receiver therewith said extraction tool.

15. The method of claim 14, wherein said fuse holder assembly comprises approximately twelve (12) to eighteen (18) inches in length.

16. The method of claim 14, wherein said projection angle comprises approximately thirty degrees (30°) to forty-five degrees (45°) from a horizontal plane.

17. The method of claim 14, wherein said seal further comprises a cylindrical annular rubber element forming an interference fit therewith an inner diameter of said fuse holder receiver.

* * * * *